United States Patent [19]
Murai

[11] 3,931,434
[45] Jan. 6, 1976

[54] METHOD OF MANUFACTURING DEHYDRATED FRUIT USED AS AN ADDITIVE TO POWDERED INSTANT FOOD

[75] Inventor: Hiroshi Murai, Tokyo, Japan

[73] Assignee: Nagatanien Honpo Co., Ltd., Tokyo, Japan

[22] Filed: Jan. 7, 1974

[21] Appl. No.: 431,386

[52] U.S. Cl. ............... 426/295; 426/96; 426/102; 426/465; 426/615
[51] Int. Cl.² ........................................ A23B 7/02
[58] Field of Search ........... 426/289, 290, 295, 378, 426/379, 811, 468, 385, 465, 203, 96, 102, 615, 548

[56] References Cited
UNITED STATES PATENTS

| | | | |
|---|---|---|---|
| 1,062,969 | 5/1913 | Harrison | 426/465 X |
| 1,099,577 | 6/1914 | Stewart | 426/378 |
| 2,415,995 | 2/1947 | Derby | 426/379 X |
| 2,650,881 | 9/1953 | Forkner | 426/378 X |
| 2,834,681 | 5/1958 | Kreager | 426/378 |
| 3,134,683 | 5/1964 | Holahan et al. | 426/378 X |
| 3,219,461 | 11/1965 | Lamb | 426/378 X |
| 3,295,995 | 1/1967 | Bright et al. | 426/378 X |
| 3,365,309 | 1/1968 | Pader et al. | 426/378 |
| 3,833,747 | 9/1974 | Cording et al. | 426/295 X |

FOREIGN PATENTS OR APPLICATIONS

| | | | |
|---|---|---|---|
| 339,808 | 4/1936 | Italy | 426/290 |
| 546,380 | 9/1957 | Canada | 426/289 |
| 551,958 | 11/1941 | United Kingdom | 426/378 |

*Primary Examiner*—Frank W. Lutter
*Assistant Examiner*—N. Greenblum
*Attorney, Agent, or Firm*—Thompson, Birch, Gauthier & Samuels

[57] ABSTRACT

A method of manufacturing dehydrated fruit used as an additive to powdered instant food which comprises covering preliminarily dried fruit with granulated sugar, flattening the fruit under pressure and dehydrating it until the dissolved sugar again solidifies.

4 Claims, No Drawings

METHOD OF MANUFACTURING DEHYDRATED FRUIT USED AS AN ADDITIVE TO POWDERED INSTANT FOOD

DETAILED DESCRIPTION OF THE INVENTION

This invention relates to a method of manufacturing dehydrated fruit used as an additive to instant food, particularly raw powdered instant food such as jelly, sherbet or ice cream.

Raw powders of, for example, instant jelly, sherbet or ice cream which are very hygroscopic are generally sold in a state sealed in a moistureproof bag. When practically prepared, the powders are dissolved in cold or hot water and cooled in a cup or mold.

Where such raw powders include dried fruit, then fully prepared food will obviously have an increased flavor and become colorful. If, however, ordinary dried fruit which generally contains about 20 percent of water is mixed with the raw powders, then they will be solidified by absorbing the water of the dried fruit. It has been found that to avoid such inconvenience, the dried fruit has to be dehydrated to a lower water than about 6 percent.

Generally, the process of dehydrating fruit is divided into two steps, namely, the constant-rate drying step and the falling-rate drying step. Further, the latter step is divided into the first stage in which the dried fruit begins to be hardened on the surface and the second stage in which the dried fruit is entirely hardened with denaturization and reduced color. Commercially available dried fruit containing about 20 percent of water is supposed to be in the first stage of the falling-rate drying step, and in the second stage of entire hardening when the fruit is dried to a far lower water content about 6 percent. However, the second-time drying of the fruit by the prior art thermal drying process consumes a long time of drying, resulting in the reduced color, denaturization and lost flavor of the fruit, and in consequence the loss of its commercial value. Moreover, fruit thus dehydrated takes a great deal of time in being restored to the original state, failing to serve as an additive to the above-mentioned instant food.

In view of the above-mentioned circumstances, powdered instant food containing dehydrated fruit has hitherto not been commercially available.

It is accordingly the object of this invention to provide a method of manufacturing dehydrated fruit which can be quickly dehydrated to a desired low water content without losing its color and flavor and moreover regain its original condition instantly and reliably.

To attain the above-mentioned object, the method of this invention comprises covering granulated sugar over the surface of fruit preliminarily dried to a prescribed extent, embedding the granulated sugar into the surface of the fruit by pressing it and finally dehydrating the sugar-coated fruit at a prescribed level of temperature until the granulated sugar melted by the water content of the fruit is again solidified.

The object and features of this invention will be more clearly understood from the following description. The raw fruit may consist of various kinds of commercially available dried fruit such as apricot, raisin and pineapple. Such dried fruit is preferred to have a water content of 20 to 30 percent. If the water content exceeds this level, the fruit will have its outline considerably deformed and undesirably attach itself to the inner walls of a press by oozing water.

Raw dried fruit first has its surface coated with granulated sugar and then is flattened to a prescribed thickness by a known device, for example, a press. At this time the granulated sugar is embedded in the surface of the fruit to prevent the fruit from sticking to the inner walls of, for example, a press with the resultant decrease in an area of contact between the surface of the fruit and said inner walls. Particles of the granulated sugar are preferred to consist of pure crystals whose particle size ranges between 40 and 65 mesh. Where the particle size is unduly fine, the granulated sugar is instantly dissolved in the water contained in the fruit, possibly causing the fruit to attach itself to the inner walls of a press. Moreover, such finely divided sugar fails to be forced fully deep into the fruit, reducing the effect of dehydrating the fruit and restoring it to the original condition as later described.

Conversely where, the particle size of the granulated sugar is excessively large, the fruit itself will be deformed and take considerable time in regaining its original condition.

The preliminarily dried fruit is pressed to the later described proper thickness in consideration of its readiness to be restored to its original condition, when actually cooked. The coating of granulated sugar and the pressing of the fruit may be carried out simultaneously or repeatedly by turns until the fruit is reduced to a prescribed thickness.

The fruit coated with granulated sugar and thereafter pressed is thermally dehydrated. In this case, the particles of granulated sugar forced into the interior of the fruit from its surface act as a medium for helping the water contained in the fruit to be dispersed in the interior and also evaporated on the surface thereof, thereby far more reducing the time of dehydrating the fruit than when it is not coated with granulated sugar. With the progress of dehydration, the dissolved granulated sugar is again solidified to provide desired dehydrated fruit. Table 1 below shows a comparison between the process of dehydrating fruit coated with granulated sugar and that of fruit free from said sugar. Samples of raw dried fruit used were cut pieces of apricot 1.3 mm thick containing 24% of water. Comparison was made between the samples whose water content after dehydration roughly averaged 6 percent. The samples were dried by hot air at 60° to 100°C.

Table 1

|  | Dehydrating temperature (°C) | Time of dehydration (minutes) | Water content after dehydration (% by weight) | Condition after dehydration |
| --- | --- | --- | --- | --- |
| Samples coated with granulated sugar | 60 | 150 | 5.98 | No change |
|  | 70 | 110 | 5.82 | No change |
|  | 80 | 90 | 5.78 | No change |
|  | 90 | 60 | 5.90 | Slightly reduced in color |

Table 1-continued

| | Dehydrating temperature (°C) | Time of dehydration (minutes) | Water content after dehydration (% by weight) | Condition after dehydration |
|---|---|---|---|---|
| | 100 | 45 | 6.07 | Reduced in color and lost flavor |
| Controls free from granulated sugar | 60 | 480 | 6.45 | Lost flavor |
| | 70 | 420 | 6.80 | Lost flavor and began to decrease in color |
| | 80 | 300 | 7.19 | Turned brown and began to be hardened on the surface |
| | 90 | 200 | 7.80 | Turned brown and hardened on the surface |
| | 100 | 150 | 8.20 | Turned brown and preliminently hardened on the surface |

As apparent from Table 1 above, fruit samples free from granulated sugar took a several times longer time of dehydration than those coated with granulated sugar, and moreover were considerably deteriorated in quality, for example, lost flavor, turned brown and were hardened on the surface. In contrast, fruit samples coated with granulated sugar were very quickly dehydrated to a lower water content than 6 percent, and were little subject to quality deterioration. To avoid, however, the loss of vitamins, and flavor and discolorment, it is preferred that dehydration be carried out at a temperature of 60° to 80°C and for a length of time ranging between 90 and 150 minutes.

Fruit thus dehydrated is cut by a cutter into pieces having a desired size and sealed in a moisture proof bag with raw powders of jelly, sherbet or ice cream. The final step of cutting fruit should preferably be effected after completion of its dehydration, because this process prevents its cut pieces from sticking to the cutter blades.

At the time of cooking, cut pieces of dehydrated fruit are mixed with the above-mentioned powdered instant food in cold or hot water. In this case, solidified granulated sugar acts as a medium for quickly drawing cold or hot water from the surface into the interior of the cut pieces of the fruit so as to help them to be restored to the original condition, and at the same time is dissolved in the water. Further, numerous pores appearing on the surface of the cut pieces of the fruit increase a contact area between the water and the cut pieces, thus promoting the restoration of said cut pieces to the original condition.

Time required for the cut pieces of dehydrated fruit to regain the original condition varies with the thickness of said cut pieces, as comparatively set forth in Table 2 below. Raw dehydrated fruit used in the experiment consisted of cut pieces of apricot containing 6 percent of water. The cut pieces were dipped in 200 c.c. of hot water at 90°C and considered to have regained the original condition when they became soft with 20 to 25 percent water content.

Table 2

| Thickness of cut pieces of apricot (mm) | Time required for restoration to the original condition | |
|---|---|---|
| | With granulated sugar | Without granulated sugar |
| 1.3 | 1 m. 45 sec. | 2 m. 40 sec. |
| 1.5 | 3 m. 45 sec. | 7 m. 30 sec. |
| 2.0 | 6 m. 30 sec. | 30 m. 00 sec. |

As seen from Table 2 above, cut pieces of apricot coated with granulated sugar took a far less time in being restored to the original condition than those of apricot free from granulated sugar, and a difference in the time of restoration between the cut pieces of both types of apricot increased more prominently as the cut pieces grew thicker.

It has been experimentally found that the cut pieces of dehydrated fruit are preferred to have a thickness of 1.2 to 1.6 mm. If the thickness decreases from this range, the cut pieces will feel undesirably soft to an eater's teeth, rendering the dehydrated fruit less commercially valuable. Conversely, if the thickness exceeds said range, the cut pieces will consume too much time in being restored to the original condition to be used as an additive to instant food such as raw powders of jelly, sherbet or ice cream.

There will now be described the example where dehydrated fruit according to this invention was used as an additive to powders of instant food, for example, jelly.

1000g of preliminarily dried apricot containing 24 percent of water was pressed by roller while being coated with fine granulated sugar having a particle size of 40 to 65 mesh. The apricot was flattened to a thickness of about 1.3 mm by being pressed twice. The apricot was dehydrated 90 minutes at a temperature of 80°C to a water content of about 5.8%, and thereafter cut into pieces each having a size of about 1 cm². A few cut pieces of the dehydrated apricot were sealed in a moisture proof bag with 27g (sufficient for 6 persons) of powders of jelly having the undermentioned composition.

| Composition of jelly powders | |
|---|---|
| Raw material | Percentage by weight |
| Gelatin | 12.50 |
| Table salt | 0.50 |
| Glucose | 3.50 |
| Sugar | 80.00 |
| Citric acid | 1.40 |
| Natural coloring matter | 0.015 |
| Flavoring agent | 0.803 |
| Others | 1.282 |

At the time of cooking, the powders of jelly and the cut pieces of dehydrated apricot were mixed in 200 c.c. of hot water at 90°C. The cut pieces were restored to the original condition in 1 minute 45 seconds as previously mentioned.

It is possible to mix 6.0g of cut pieces of the aforesaid dehydrated apricot with the powders of sherbet having a composition shown below.

| Composition of sherbet powders | |
|---|---|
| Raw material | Percentage by weight |
| Sugar | 79.47 |
| Glucose | 16.56 |
| Citric acid | 0.99 |
| Table salt | 0.33 |
| Fruit juice flavoring agent | 2.65 |

What is claimed is:

1. A method of manufacturing dehydrated fruit used as an additive to powdered instant food which comprises coating granulated sugar on the surface of raw preliminarily dried fruit containing 20 to 30 percent of water, mechanically pressing the fruit so as to embed the granulated sugar into the fruit in a solid state and dehydrating the fruit thus embedded with the granulated sugar at a temperature up to 100°C until the water content in the fruit is reduced to below 6 percent.

2. A method according to claim 1 wherein said fruit is apricot.

3. A method according to claim 2 wherein the raw preliminarily dried fruit is dehydrated at a temperature of 60° to 80°C for a length of time ranging between 90 and 150 minutes.

4. A method according to claim 3 wherein the granulated sugar has a particle size of 40 to 65 mesh.

* * * * *